(12) United States Patent
Jain et al.

(10) Patent No.: US 7,556,671 B2
(45) Date of Patent: *Jul. 7, 2009

(54) SYSTEM AND METHOD FOR PURIFYING A GAS

(75) Inventors: Ravi Jain, Bridgewater, NJ (US); YuDong Chen, Bridgewater, NJ (US)

(73) Assignee: The BOC Group, Inc., Murray Hill, NJ (US)

( * ) Notice: Subject to any disclaimer, the term of this patent is extended or adjusted under 35 U.S.C. 154(b) by 471 days.

This patent is subject to a terminal disclaimer.

(21) Appl. No.: 11/500,146

(22) Filed: Aug. 7, 2006

(65) Prior Publication Data

US 2007/0028773 A1 Feb. 8, 2007

Related U.S. Application Data

(60) Provisional application No. 60/706,325, filed on Aug. 8, 2005.

(51) Int. Cl.
*B01D 53/04* (2006.01)

(52) U.S. Cl. .............................. 95/90; 95/135; 96/132; 96/133

(58) Field of Classification Search .................. 95/117, 95/135–137, 143, 90; 96/132, 133, 154; 423/244.01–244.04; 422/190, 191, 211, 422/222

See application file for complete search history.

(56) References Cited

U.S. PATENT DOCUMENTS

| | | | |
|---|---|---|---|
| 2,594,268 A | 4/1952 | Geisel | |
| 4,332,781 A | 6/1982 | Lieder et al. | |
| 4,539,019 A * | 9/1985 | Koch | 95/19 |
| 5,451,248 A * | 9/1995 | Sadkowski et al. | 95/99 |
| 5,512,260 A | 4/1996 | Kiliany et al. | |
| 5,536,301 A | 7/1996 | Lansbarkis et al. | |
| 5,542,968 A * | 8/1996 | Belding et al. | 96/125 |
| 5,626,820 A * | 5/1997 | Kinkead et al. | 422/122 |
| 5,674,463 A | 10/1997 | Dao et al. | |
| 5,704,965 A | 1/1998 | Tom et al. | |
| 5,772,738 A * | 6/1998 | Muraoka | 96/129 |
| 5,858,068 A | 1/1999 | Lansbarkis et al. | |
| 5,906,675 A * | 5/1999 | Jain et al. | 95/99 |
| 5,914,455 A * | 6/1999 | Jain et al. | 95/96 |
| 5,944,878 A * | 8/1999 | Lindhe | 96/132 |
| 6,099,619 A | 8/2000 | Lansbarkis et al. | |
| 6,402,813 B2 | 6/2002 | Monereau et al. | |
| 6,441,264 B1 | 8/2002 | LeMaire et al. | |
| 6,764,535 B1 * | 7/2004 | Lansbarkis et al. | 96/132 |
| 6,797,036 B2 | 9/2004 | Funke et al. | |
| 6,962,629 B2 | 11/2005 | Johnson | |
| 7,135,604 B2 | 11/2006 | Ding et al. | |
| 2002/0150522 A1 | 10/2002 | Heim et al. | |
| 2003/0198585 A1 | 10/2003 | Salma et al. | |
| 2003/0200866 A1 * | 10/2003 | Weyrich et al. | 95/129 |
| 2004/0052708 A1 | 3/2004 | Rao et al. | |
| 2005/0019240 A1 | 1/2005 | Lu et al. | |
| 2005/0098495 A1 | 5/2005 | Hughes | |
| 2005/0265912 A1 | 12/2005 | Alvarez Jr et al. | |
| 2007/0028764 A1 | 2/2007 | Wittrup et al. | |

(Continued)

*Primary Examiner*—Frank M Lawrence
(74) *Attorney, Agent, or Firm*—Joshua L. Cohen

(57) ABSTRACT

The present invention provides for a method for purifying carbon dioxide. Moisture, sulfur species and other impurities are removed from the carbon dioxide by a series of steps which include adsorption means and reaction means. All the steps are preferably carried out in a single vessel.

34 Claims, 1 Drawing Sheet

U.S. PATENT DOCUMENTS

2007/0028766 A1 2/2007 Jain
2007/0028772 A1 2/2007 Jain et al.
2007/0031302 A1 2/2007 Wittrup et al.
2007/0031309 A1 2/2007 Jain et al.
2007/0031974 A1 2/2007 Jain et al.

* cited by examiner

SYSTEM AND METHOD FOR PURIFYING A GAS

FIELD OF THE INVENTION

The present invention provides a system and method for purifying a gas. In particular, this invention provides a system and method for purifying a carbon dioxide gas stream on-site.

BACKGROUND OF THE INVENTION

Carbon dioxide is used in a number of industrial and domestic applications, many of which require the carbon dioxide to be free from various impurities. Unfortunately, carbon dioxide obtained from natural sources such as gas wells, chemical processes, fermentation processes or produced in industry, particularly carbon dioxide produced by the combustion of hydrocarbon products, often contains impurity levels of sulfur compounds such as carbonyl sulfide (COS) and hydrogen sulfide ($H_2S$) as well as oxygenates such as acetaldehydes and alcohols as well as aromatics such as benzene. When the carbon dioxide is intended for use in an application that requires the carbon dioxide to be of high purity, such as in the manufacture and cleaning of foodstuffs and beverage carbonation, medical products and electronic devices, the sulfur compounds and other hydrocarbon impurities contained in the gas stream must be removed to very low levels prior to use. The level of impurity removal required varies according to the application of carbon dioxide. For example for beverage application the total sulfur level in carbon dioxide ($CO_2$) ideally should be below 0.1 and aromatic hydrocarbons need to be below 0.02 . For electronic cleaning applications removal of heavy hydrocarbons to below 0.1 is required.

Various methods for removing sulfur compounds and hydrocarbon impurities from gases such as carbon dioxide are known. For example, U.S. Pat. No. 4,332,781, issued to Lieder et al., discloses the removal of COS and $H_2S$ from a gas stream by first removing the $H_2S$ from the hydrocarbon gas stream by contacting the gas stream with an aqueous solution of a regenerable oxidizing reactant, which may be a polyvalent metallic ion, such as iron, vanadium, copper, etc., to produce a COS-containing gas stream and an aqueous mixture containing sulfur and reduced reactant. The COS in the gas stream is subsequently hydrolyzed to $CO_2$ and $H_2S$ by contacting the gas stream with water and a suitable hydrolysis catalyst, such as nickel, platinum, palladium, etc., after which the $H_2S$ and, if desired, the $CO_2$ are removed. This step can be accomplished by the earlier described $H_2S$ removal step or by absorption. The above-described process involves the use of cumbersome and costly equipment and liquid-based systems which require considerable attention and may result in the introduction of undesirable compounds, such as water vapor, into the carbon dioxide product.

U.S. Pat. Nos. 5,858,068 and 6,099,619 describe the use of a silver exchanged faujasite and an MFI-type molecular sieve for the removal of sulfur, oxygen and other impurities from carbon dioxide intended for food-related use. U.S. Pat. No. 5,674,463 describes the use of hydrolysis and reaction with metal oxides such as ferric oxide for the removal of carbonyl sulfide and hydrogen sulfide impurities from carbon dioxide.

It is known to directly remove sulfur compounds, such as $H_2S$ from a gas stream by contacting the gas stream with metal oxides, such as copper oxide, zinc oxide or mixtures of these. It is also known to remove sulfur impurities such as COS by first hydrolyzing COS to $H_2S$ over a hydrolysis catalyst and then removing $H_2S$ by reaction with metal oxides. Removal of $H_2S$ by reaction with metal oxides can become expensive, since the catalyst is non-regenerable and expensive, when impurities such as COS and $H_2S$ are present in more than trace amounts. Lower cost materials for the removal of COS and $H_2S$ and other sulfur impurities such as mercaptans and dimethyl sulfide are desired to reduce $CO_2$ purification cost. Lower cost removal of other impurities such as acetaldehyde, alcohols and aromatics such as benzene is also required.

Since many end users of carbon dioxide require the carbon dioxide they use to be substantially free of sulfur compounds, hydrocarbon and other impurities, and because natural sources of carbon dioxide and industrially manufactured carbon dioxide often contain sulfur and hydrocarbon compounds, economic and efficient methods for effecting substantially complete removal of sulfur and hydrocarbon compounds from carbon dioxide gas streams, without concomitantly introducing other impurities into the carbon dioxide, are continuously sought. The present invention provides a simple and efficient method for achieving these objectives.

The present invention is suitable for the on-site purification of carbon dioxide at locations such as a beverage filling plant, a beverage dispensing location such as a fountain or an electronics manufacturing location.

SUMMARY OF THE INVENTION

The present invention provides a means for on-site purification of carbon dioxide by passing it over a bed containing a desiccant for water removal, a bed containing Y zeolite or its ion-exchanged forms for the removal of dimethyl sulfide and oxygenates and a bed containing an impregnated activated carbon for the removal of aromatics and sulfur compounds. All the beds may be contained in a single vessel or a heater can be used after the Y zeolite bed to improve removal of sulfur compounds.

In an embodiment, this invention is directed to a method for purifying a gas stream comprising passing an impure gas stream for treatment through at least one adsorbent bed containing at least two adsorbents selected from the group consisting of a desiccant; a zeolite or a zeolite in its ion exchange form, and an activated carbon.

In an embodiment, the gas stream is a carbon dioxide gas stream.

In another embodiment, the method for purifying a carbon dioxide gas stream comprising passing a carbon dioxide gas stream for treatment through at least one adsorbent bed containing at least two adsorbents selected from the group consisting of a desiccant; a zeolite or a zeolite in its ion exchange form, and an activated carbon.

In yet another embodiment, this invention provides a system for purifying a carbon dioxide gas stream comprising at least one adsorbent bed containing at least two adsorbents selected from the group consisting of a desiccant; a zeolite or a zeolite in its ion exchange form, and an activated carbon.

BRIEF DESCRIPTION OF THE DRAWINGS

While the specification concludes with claims distinctly pointing the subject matter that Applicants regard as their invention, the invention would be better understood when taken in connection with the accompanying drawing in which:

DETAILED DESCRIPTION OF THE INVENTION

Figure 1:
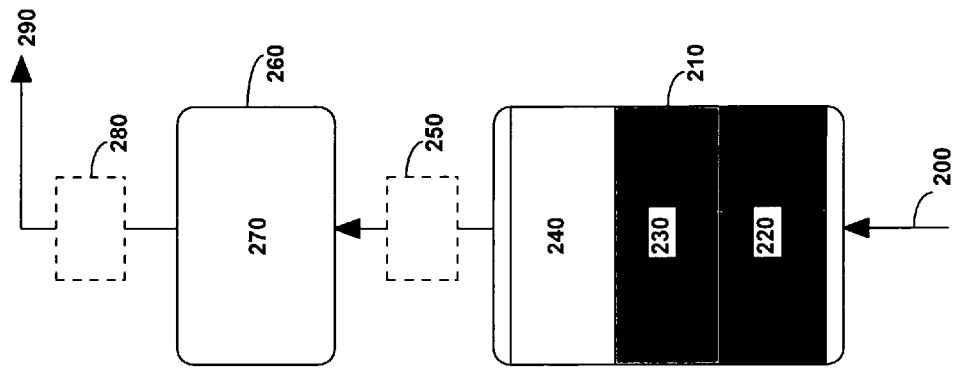
FIG. 1 is a description of the purification of carbon dioxide according to this invention.

The carbon dioxide that is typically produced for industrial operations has a number of impurities present in it. These impurities will often be a concern for many uses of the carbon dioxide, but in the production of products intended for human consumption such as carbonated beverages, and electronic manufacturing the purity of the carbon dioxide is paramount and can influence the taste, quality, and legal compliance of the finished product.

The impure carbon dioxide which can be obtained from any available source of carbon dioxide will typically contain as impurities sulfur compounds such as carbonyl sulfide, hydrogen sulfide, dimethyl sulfide, sulfur dioxide and mercaptans, hydrocarbon impurities such as aldehydes, alcohols, aromatics, and other impurities such as water. Many of these impurities are removed in a carbon dioxide production plant. However, due to change in feed composition, ageing of purification media and process upsets small amounts of these impurities may end up in the final $CO_2$ product and have to be removed prior to use in applications such as beverage filling and electronics manufacturing. This invention describes novel, low cost methods for the removal of various impurities. The impurity removal methods of this invention will typically be used at the point of use. Various point of use applications of carbon dioxide include a beverage filling plant, a food freezing plant, an electronics manufacturing plant and a fountain type carbon dioxide dispensing location.

This invention relates to the removal of moisture, hydrocarbon impurities such as acetaldehydes, alcohols, acetates and aromatics, and sulfur impurities such as carbonyl sulfide, sulfur dioxide, hydrogen sulfide, dimethyl sulfide, and mercaptans at the point of use.

The stream at close to ambient temperatures is sent to an adsorbent bed for the removal of water and other impurities. The adsorbents used will depend on the impurities in the feed. Typically, an adsorbent such as activated alumina (AA), a zeolite such as 4A, 5A, 13X or NaY, or silica gel will be used for moisture removal. Additionally, for the purposes of this invention the adsorbent bed will contain a zeolite such as NaY or its ion-exchanged forms such as KY or KNaY for the removal of impurities such as aldehydes, alcohols such as methanol and ethanol, acetates such as methyl and ethyl acetates and some of the trace sulfur compounds such as dimethyl sulfur compounds. For these impurities Y zeolites have significantly higher capacity than other zeolites and non-zeolitic materials. For aromatics such as benzene and toluene, other adsorbents such as activated carbon or dealuminated Y zeolite can be used.

The sulfur purification materials according to this invention include carbonates and hydroxides such as sodium and potassium hydroxides or carbonates on activated carbon; metal oxides such as copper, zinc, chromium or iron oxide either alone or supported on a microporous adsorbent such as activated alumina, activated carbon or silica gel. Other materials such as a CuY zeolite are effective for the removal of carbonyl sulfide and sulfur dioxide impurities through reaction. Removal of carbonyl sulfide and hydrogen sulfide by hydroxides and carbonates requires addition of oxygen to the feed.

For the purposes of this invention at least some of the sulfur impurities such as hydrogen sulfide and carbonyl sulfide may be removed at an elevated temperature, a temperature of 50° to 150° C.

For multiple impurities the adsorbents in the bed need to be layered. A typical bed arrangement for feed from the bottom will be a water removal adsorbent in the bottom followed by a Y zeolite in the middle and an activated carbon/DAY adsorbent in the top. If an impregnated activated carbon (impregnated with sodium or potassium hydroxides and carbonates, or copper oxide or chloride) is used as the last layer it will remove various sulfurs in addition to aromatic impurities. If a non-impregnated activated carbon is used it will remove aromatic impurities as well as mercaptans and some oxygenates. In this case another material for the removal of other sulfur impurities such as zinc oxide or copper-zinc oxide may be needed.

In addition to the impurities discussed above, the impurities such as ammonia and sulfur dioxide will also be removed in the adsorbent bed. The adsorbent bed can be used in once through mode where the adsorbent material is replaced after it has been used up or it can be regenerated. A thermal regeneration at temperatures between 150 and 300° C. with a stream relatively free of impurities will typically be carried out. Part of purified carbon dioxide may be used as the regeneration gas.

For point of use purification such as purification of carbon dioxide prior to beverage fill or electronic manufacturing the impure carbon dioxide will be transported from a storage tank into the purification equipment at flow typical of customer usage. These flow rates can range from 80 to 1,500 std $m^3$/hr depending on the final application and the size of the production facility. The carbon dioxide will typically be at a pressure in the range of about 1.7 bara to about 21.5 bara with about 16 to about 19 bara being typical. In certain applications, particularly those related to the carbon dioxide for electronic cleaning, the pressures could range between 60 to several hundred bara. For carbon dioxide purification at a fountain location the typical flow rates are 5 std liters/min and typical pressures are between 2 and 6 bara.

Purification of carbon dioxide using a single adsorption column prior to point of use such as beverage filling or carbon dioxide dispensing in a fountain is shown in FIG. 1. In FIG. 1 carbon dioxide vaporized from a storage tank, not shown, enters the system at line 200. Oxygen, not shown, can optionally be added to this stream. Moisture from the stream is removed by an adsorbent layer 220 and oxygenates and some other sulfur compounds such as dimethyl sulfide (DMS) and $SO_2$ are removed by adsorbent layer 230. Both these adsorbent layers are contained in a vessel 210. Adsorbents in layer 220 would typically be activated alumina, silica gel or a zeolite and the adsorbent in layer 230 will be a NaY zeolite or its ion-exchanged forms. For the sake of simplicity a single layer of Y zeolite can be used for the removal of moisture, oxygenates and sulfur compounds. The third layer in the bed, layer 240, contains materials for the removal of aromatics such as benzene and sulfurs such as carbonyl sulfide, hydrogen sulfide and mercaptans. If an impregnated activated carbon containing copper oxide/chloride or sodium and potassium hydroxides/carbonates is used then this layer can remove both the aromatics and sulfurs. If a material such as zinc oxide is used for the removal of sulfurs then either activated carbon or dealuminated Y zeolite (DAY) would be needed for the removal of aromatics and mercaptans.

To improve the efficiency for the removal of sulfur compounds these impurities can be removed in a separate bed operated at a higher temperature. In this case layer 240 would be either be a DAY zeolite or non-impregnated activated carbon for the removal of aromatics. The stream exiting vessel 210 is optionally heated in heater 250 to about 50-150° C. and sent to an adsorbent layer 270 contained in vessel 260. Adsorbent layer 270 is an activated carbon impregnated with metal oxides, or sodium or potassium hydroxides or carbonates for the removal of aromatics and sulfur impurities such as hydrogen sulfide, carbonyl sulfide and mercaptans. For fountain use, heater 250 is eliminated and the adsorbent layers 220, 230 and 240 are contained in a single vessel. For use in beverage filling plant both the heater 250 and the cooler 280 at the outlet of bed 260 can be used to improve the efficiency of the removal of sulfur compounds. Purified carbon dioxide stream 290 can be optionally analyzed prior to use in beverage or in electronic applications.

EXAMPLE 1

A feed containing 145 methanol in carbon dioxide at a pressure of 14.6 bara and a temperature of 25° C. was passed through a bed containing 0.295 kgs of 6×8 mesh NaY zeolite at a flow rate of 19.8 std liters/min. No methanol breakthrough (<1 methanol in product) was seen for 170 hours and an equilibrium methanol capacity of 16.4 wt % was obtained.

The same feed was passed through a bed containing 0.345 kgs of ⅛" activated alumina, commonly used adsorbent for methanol removal from $CO_2$. The breakthrough time was reduced to less than 63 hours and an equilibrium capacity for methanol of 5.8 wt % was obtained.

Use of NaY zeolite for methanol removal as per the teachings of this invention results in more than 180% increase in methanol removal capacity.

EXAMPLE 2

A feed containing 50 acetaldehyde in carbon dioxide at a pressure of 14.6 bara and a temperature of 25° C. was passed through different beds containing 0.054 kgs of Alcoa Selexsorb CD, Alcoa Selexsorb CDX and a NaY zeolite, respectively at a flow rate of 19.8 std liters/min. Adsorbent sizes were around 3 mm in all the cases. Selexsorb CD and Selexsorb CDX are the commonly used adsorbents for the removal of acetaldehyde from carbon dioxide. The equilibrium acetaldehyde capacity for Selexsorb CD, Selexsorb CDX and NaY zeolites were 1.8, 4.0 and 9 wt %, respectively. The use of NaY zeolite according to the teachings of this invention leads to significant improvement in removal performance for acetaldehyde.

EXAMPLE 3

A feed containing 9 COS in carbon dioxide at a pressure of 14.6 bara and a temperature of 100° C. was passed through a bed containing 0.12 kgs of activated carbon containing 20 wt % potassium carbonate at a flow rate of 19.8 std liters/min. About 100 of oxygen was added to the feed. An equilibrium COS capacity of 5.15 wt % was obtained at this temperature. The same feed was passed through the same bed at a temperature of 25° C. and an equilibrium COS capacity of less than 0.1 wt % was obtained.

The same feed now containing 50 $H_2S$ in carbon dioxide at a pressure of 14.6 bara and a temperature of 100° C. was passed through a bed containing 0.154 kgs of activated carbon containing 20 wt % potassium carbonate at a flow rate of 15.6 std liters/min. About 100 oxygen was added to the feed. An equilibrium $H_2S$ capacity of 18 wt % was obtained. The same feed was passed through the same bed at a temperature of 25° C. and an equilibrium $H_2S$ capacity of around 10 wt % was obtained.

Both these experiments indicate that a significant improvement in the removal capacity for COS and $H_2S$ is possible by operating the sulfur removal at an elevated temperature.

EXAMPLE 4

A multilayer bed was assembled according to teachings of this invention. The bed contained a first layer of 0.133 kgs of UOP NaY zeolite in 3 mm size, a second layer of 0.123 kgs of activated carbon impregnated with copper oxide and a third layer of 0.112 kgs of Norit RB4 activated carbon. The internal diameter of the vessel was 0.075 meters.

A feed containing 100 methanol, 1 carbonyl sulfide, 1 hydrogen sulfide, 2 acetaldehyde and 0.2 benzene was passed through this bed at a flow rate of 20 std liters/min, a pressure of 7 bara and a temperature of 25° C. The test was run for 18 days. No benzene and hydrogen sulfide breakthrough was seen during the test. Methanol, acetaldehyde and carbonyl sulfide did breakthrough after several days though high capacities for each of these impurities was obtained. The methanol and acetaldehyde capacities were similar to those in examples 1 and 2.

Much higher impurity levels (10-100 times) than those expected in a fountain or a beverage fill location were used in this example. For the typical levels of impurities in carbon dioxide and typical flow rates (5 std liters/min in a fountain location) it is expected that a bed of this example will last for several months.

While the present invention has been described with reference to several embodiments and examples, numerous changes, additions and omissions, as will occur to those skilled in the art, may be made without departing from the spirit and scope of the present invention.

What is claimed is:

1. A method for purifying a carbon dioxide gas stream comprising passing a carbon dioxide gas stream for treatment through at least one adsorbent bed containing at least two adsorbent layers selected from the group consisting of a desiccant; a zeolite; a zeolite in its ion exchange form; and an activated carbon; wherein at least one of the at least two adsorbent layers comprises a Y zeolite or a Y zeolite in its ion exchange form capable of removing an impurity comprising at least one of aldehydes, alcohols, acetates or sulfur compounds.

2. The method as claimed in claim 1 wherein the desiccant is selected from the group consisting of a 4A, 5A, 13X and NaY zeolite.

3. The method as claimed in claim 1 wherein the zeolite is NaY or its ion exchange form, KY or KNaY.

4. The method as claimed in claim 1 wherein the activated carbon is an impregnated activated carbon.

5. The method as claimed in claim 1 further comprising heating the carbon dioxide gas stream to about 50° C.-150° C. after the carbon dioxide gas stream passes through the zeolite bed.

6. The method as claimed in claim 1 comprising passing the carbon dioxide gas stream through a single vessel.

7. The method as claimed in claim 1 comprising passing the carbon dioxide gas stream in a plurality of vessels.

8. The method as claimed in claim 1 comprising purifying the carbon dioxide gas stream in an on-site facility.

9. A system for purifying a gas stream comprising at least one adsorbent bed containing at least two adsorbent layers selected from the group consisting of a desiccant; a zeolite; a zeolite in its ion exchange form; and an activated carbon; wherein at least one of the at least two adsorbent layers comprises a Y zeolite or a Y zeolite in its ion exchange form capable of removing an impurity comprising at least one of aldehydes, alcohols, acetates or sulfur compounds.

10. The system as claimed in claim 9 wherein the gas stream is a carbon dioxide gas stream.

11. The system as claimed in claim 9 wherein the desiccant is selected from the group consisting of a 4A, 5A, 13X and NaY zeolite.

12. The system as claimed in claim 9 wherein the zeolite is NaY or its ion exchange form, KY or KNaY.

13. The system as claimed in claim 9 wherein the activated carbon is an impregnated activated carbon.

14. The system as claimed in claim 9 further comprising a heat source to apply to the gas stream after the gas stream passes through the zeolite bed.

15. The system as claimed in claim 9 wherein the at least one absorbent bed is contained in a single vessel.

16. The system as claimed in claim 9 wherein the at least one adsorbent bed is contained in a plurality of vessels.

17. A system for purifying a carbon dioxide gas stream comprising at least one adsorbent bed containing a first adsorbent layer comprising a desiccant, and a second adsorbent layer comprising a Y zeolite or an ion exchanged Y zeolite capable of removing an impurity comprising at least one of aldehydes, alcohols, acetates or sulfur compounds.

18. The system as claimed in claim 17 wherein the at least one adsorbent bed contains a third layer comprising at least one material capable of removing at least one of sulfur impurities or aromatic hydrocarbons.

19. The system as claimed in claim 17 further comprising a second adsorbent bed containing at least one material capable of removing at least one of sulfur impurities or aromatic hydrocarbons.

20. The system as claimed in claim 19 wherein the second adsorbent bed contains at least one of activated carbon, an impregnated activated carbon, or DAY zeolite.

21. The system as claimed in claim 17 wherein the at least one adsorbent bed contains at least one of activated carbon, an impregnated activated carbon, or DAY zeolite.

22. The system as claimed in claim 17 wherein the desiccant is selected from the group consisting of a 4A, 5A, 13X and NaY zeolite.

23. The system as claimed in claim 17 wherein the at least one adsorbent bed comprises at least one of NaY zeolite, ion exchanged KY zeolite, or ion exchanged KNaY zeolite.

24. The system as claimed in claim 17 further comprising a heat source for application of heat to the gas stream after the gas stream passes through the zeolite bed.

25. The system as claimed in claim 17 wherein the at least one absorbent bed is contained in a single vessel.

26. The system as claimed in claim 17 wherein the at least one adsorbent bed is contained in a plurality of vessels.

27. A method for purifying a carbon dioxide gas stream comprising passing a carbon dioxide gas stream for treatment through at least one adsorbent bed containing a first adsorbent layer comprising a desiccant, and a second adsorbent layer comprising a Y zeolite or an ion exchanged Y zeolite capable of removing an impurity comprising at least one of aldehydes, alcohols, acetates or sulfur compounds.

28. The method as claimed in claim 27 wherein the at least one adsorbent bed contains a third layer comprising at least one material capable of removing at least one of sulfur impurities or aromatic hydrocarbons.

29. The method as claimed in claim 27 further comprising passing the carbon dioxide gas stream through a second adsorbent bed containing at least one material capable of removing at least one of sulfur impurities or aromatic hydrocarbons.

30. The method as claimed in claim 29 wherein the second adsorbent bed contains at least one of activated carbon, an impregnated activated carbon, or DAY zeolite.

31. The method as claimed in claim 29 further comprising heating the carbon dioxide gas stream to about 50° C.-150° C. before passing the carbon dioxide gas stream through the second adsorbent bed.

32. The method as claimed in claim 27 wherein the at least one adsorbent bed contains at least one of activated carbon, an impregnated activated carbon, or DAY zeolite.

33. The method as claimed in claim 27 wherein the desiccant is selected from the group consisting of a 4A, 5A, 13X and NaY zeolite.

34. The method as claimed in claim 27 wherein the at least one adsorbent bed comprises at least one of NaY zeolite, ion exchanged KY zeolite, or ion exchanged KNaY zeolite.

* * * * *